(12) United States Patent
Yamamoto et al.

(10) Patent No.: US 8,718,849 B2
(45) Date of Patent: *May 6, 2014

(54) HYBRID VEHICLE AND CONTROL METHOD THEREFOR

(75) Inventors: Masaya Yamamoto, Kasugai (JP); Yuu Nakao, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,061

(22) PCT Filed: Jun. 25, 2010

(86) PCT No.: PCT/JP2010/060854
§ 371 (c)(1),
(2), (4) Date: Jun. 29, 2012

(87) PCT Pub. No.: WO2011/161816
PCT Pub. Date: Dec. 29, 2011

(65) Prior Publication Data
US 2012/0277946 A1     Nov. 1, 2012

(51) Int. Cl.
*B60W 20/00* (2006.01)
(52) U.S. Cl.
USPC .......... 701/22; 180/65.265; 903/930
(58) Field of Classification Search
USPC .......... 701/22; 180/65.265; 903/930
See application file for complete search history.

(56) References Cited

U.S. PATENT DOCUMENTS

| 2006/0108956 A1 | 5/2006 | Clark et al. |
| 2010/0102767 A1* | 4/2010 | Endo et al. ............ 318/453 |

FOREIGN PATENT DOCUMENTS

| JP | 2006-077641 A | 3/2006 |
| JP | 2006-109650 A | 4/2006 |
| JP | 2006166693 A | 6/2006 |
| JP | 2008-201260 A | 9/2008 |
| JP | 2008-285011 A | 11/2008 |
| JP | 2009-113706 A | 5/2009 |

OTHER PUBLICATIONS

International Search Report mailed Jul. 27, 2010 of PCT/JP2010/060854.
Espacenet, English-language abstract of JP2006166693A.

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

In a hybrid vehicle, motor traveling using only an output of a rotating electric machine utilizing electric power of a vehicle-mounted power storage device is applicable in a region inside a maximum output line in motor traveling for an EV mode, and in a region inside a maximum output line in motor traveling for an EV mode. Each of the maximum output lines is composed of straight line portions defining an upper limit torque and an upper limit vehicle speed and a curved line portion defining upper limit output power, in motor traveling. Therefore, if a vehicle speed exceeds the upper limit vehicle speed in motor traveling in each of the EV mode and the HV mode, an engine is started. A motor traveling upper limit vehicle speed in the EV mode is set to be lower than a motor traveling upper limit vehicle speed in the HV mode.

14 Claims, 11 Drawing Sheets

US 8,718,849 B2

HYBRID VEHICLE AND CONTROL METHOD THEREFOR

This is a 371 national phase application of PCT/JP2010/060854 filed 25 Jun. 2010, the contents of which are incorporated herein by reference.

FIELD OF THE INVENTION

The present invention relates to a hybrid vehicle and a control method therefor, and more particularly to traveling control for a hybrid vehicle allowing selection between traveling using only an output of a rotating electric machine and traveling using outputs of the rotating electric machine and an engine.

BACKGROUND OF THE INVENTION

Hybrid vehicles configured such that a rotating electric machine generates a vehicle driving force using electric power from a secondary battery mounted in a vehicle have been attracting attention.

Japanese Patent Laying-Open No. 2008-285011 (PTL 1) describes a hybrid vehicle in which selection is made between a mode in which the vehicle travels by operating at least an engine and a mode in which the vehicle travels by stopping the engine and using only an output of a motor generator. PTL 1 describes that, in the hybrid vehicle, replacement timing of consumable parts related to the engine is determined based on an operation result of the engine.

Further, hybrid vehicles require traveling control which can avoid excessive charging/discharging of a vehicle-mounted secondary battery and also ensure driving performance in response to a driver's request. Japanese Patent Laying-Open No. 2006-109650 (PTL 2) describes a control device for a vehicle and a method for controlling a vehicle. PTL 2 describes that an upper limit value or a lower limit value of the amount of change of a torque generated by a traction motor serving as a rotating electric machine generating a vehicle driving force is set based on a limit value of output power or input power of a secondary battery and a speed of the vehicle. Thereby, it is aimed that the traction motor outputs a torque requested by a driver without causing excessive charging/discharging of the secondary battery.

As described in PTL 2, it is common to set upper limit values of input power and output power of a secondary battery based on a state of charge (SOC) and a temperature of the secondary battery. An output of a traction motor is set in a range where the output power of the secondary battery does not exceed the upper limit value. Thus, if the output power upper limit value is limited due to a reduction in the SOC or an increase in the temperature of the secondary battery, the output of the traction motor is also limited.

CITATION LIST

Patent Literature

PTL 1: Japanese Patent Laying-Open No. 2008-285011
PTL 2: Japanese Patent Laying-Open No. 2006-109650

SUMMARY OF INVENTION

Technical Problem

In a hybrid vehicle, either traveling using only an output of a rotating electric machine (hereinafter also referred to as "motor traveling") or traveling using outputs of the rotating electric machine and an engine (hereinafter also referred to as "hybrid traveling") is used to suit the situation. Thereby, energy efficiency is improved (i.e., fuel efficiency is improved) by limiting operation of the engine to a high efficiency region while effectively using electric power stored in a secondary battery. Further, so-called plug-in hybrid vehicles, in which a vehicle-mounted secondary battery can be charged by a power source external to a vehicle, has been attracting attention as one type of hybrid vehicle. In particular, it is aimed in plug-in hybrid vehicles to apply motor traveling using only an output of a rotating electric machine for a long period of time.

On the other hand, when a hybrid vehicle travels at a high vehicle speed, driving resistance is increased, and thus a high load state tends to be caused even if the vehicle travels steadily without acceleration. Thus, if the vehicle continues traveling at a high vehicle speed using only an output of a rotating electric machine, there is a possibility that a state where an output current from a secondary battery, that is, a passing current of an electric system for driving and controlling the rotating electric machine, is relatively large may be continued. As a result, in order to suppress an increase in the temperature of components of the electric system and an increase in the load on the secondary battery, a limit value of output power from the secondary battery is likely to be strictly limited as described above.

Therefore, preferably, an upper limit vehicle speed in motor traveling is set, and, if the vehicle speed exceeds the upper limit vehicle speed, an engine is started to apply hybrid traveling. It is simply understood that setting a high upper limit vehicle speed leads to increased opportunities for motor traveling.

However, if the upper limit vehicle speed is set too high, since motor traveling at a high vehicle speed is allowed, the state where the output current from the secondary battery is relatively large is likely to be continued, which is likely to cause a state where the output power of the secondary battery is strictly limited as described above. Once such a state is established, limitation on the output power may be continued for a long period of time until a reduction in the SOC and an increase in temperature are recovered. During such a limitation period, the engine may be operated more frequently than usual to ensure output and acceleration performance. Thus, there is a possibility that, by setting the upper limit vehicle speed too high, opportunities for motor traveling cannot be ensured on the contrary, causing a reduction in energy efficiency (i.e., deterioration in fuel efficiency) and deterioration in emission.

The present invention has been made to solve such problems, and one object of the present invention is to appropriately set an upper limit vehicle speed for traveling of a vehicle using only an output of a rotating electric machine, to improve energy efficiency and emission property of a hybrid vehicle by appropriately ensuring opportunities for motor traveling.

Solution to Problem

According to one aspect of the present invention, a hybrid vehicle includes a rotating electric machine for generating a vehicle driving force, a power storage device mounted in the vehicle, a power control unit for performing power conversion between the power storage device and the rotating electric machine, an internal combustion engine for generating a vehicle driving force, an external charging unit for charging the power storage device by a power source external to the vehicle, and a control device for controlling traveling of the vehicle. The control device includes a traveling mode selection unit, an upper limit vehicle speed setting unit, and a traveling control unit. The traveling mode selection unit is configured to select, in response to a state of charge of the power storage device, one of a first traveling mode in which the internal combustion engine and the rotating electric machine are used such that the vehicle travels mainly using an output of the rotating electric machine irrespective of a residual capacity of the power storage device, and a second traveling mode in which the internal combustion engine and the rotating electric machine are used such that the vehicle travels with the residual capacity of the power storage device being maintained within a predetermined control range. The upper limit vehicle speed setting unit is configured to set an upper limit vehicle speed for traveling of the vehicle using only the output of the rotating electric machine, in response to the traveling mode selected by the traveling mode selection unit. The traveling control unit is configured to control traveling of the vehicle to use both of outputs of the internal combustion engine and the rotating electric machine, if a vehicle speed exceeds the upper limit vehicle speed. The upper limit vehicle speed setting unit sets the upper limit vehicle speed in the first traveling mode to be lower than the upper limit vehicle speed in the second traveling mode.

Preferably, the traveling control unit controls the rotating electric machine and the internal combustion engine in the first traveling mode such that, if the hybrid vehicle has a torque and a vehicle speed inside a first region, the vehicle travels using only the output of the rotating electric machine, and if the hybrid vehicle has a torque and a vehicle speed outside the first region, the vehicle travels using both of the outputs of the rotating electric machine and the internal combustion engine. The traveling control unit controls the rotating electric machine and the internal combustion engine in the second traveling mode such that, if the hybrid vehicle has a torque and a vehicle speed inside a second region, the vehicle travels using only the output of the rotating electric machine, and if the hybrid vehicle has a torque and a vehicle speed outside the second region, the vehicle travels using both of the outputs of the rotating electric machine and the internal combustion engine. The first and second regions are set reflecting the upper limit vehicle speed set by the upper limit vehicle speed setting unit.

Preferably, in the first traveling mode, the upper limit vehicle speed setting unit variably sets the upper limit vehicle speed within a range lower than the upper limit vehicle speed in the second traveling mode, based on at least one of the state of charge and an input/output current of the power storage device.

More preferably, the control device further includes a state-of-charge estimation unit, a current load estimation unit, and a charging/discharging control unit. The state-of-charge estimation unit is configured to calculate an estimated residual capacity value of the power storage device based on an output of a sensor arranged in the power storage device. The current load estimation unit is configured to calculate a current load parameter indicating a thermal load on equipment due to passage of the input/output current of the power storage device, based on the input/output current. The charging/discharging control unit is configured to variably set an output power upper limit value of the power storage device based on the calculated estimated residual capacity value and current load parameter. In the first traveling mode, the upper limit vehicle speed setting unit variably sets the upper limit vehicle speed, at least based on the calculated current load parameter.

More preferably, the upper limit vehicle speed setting unit sets the upper limit vehicle speed in the first traveling mode, in accordance with a minimum value of a first upper limit speed variably set in response to the current load parameter and a second upper limit speed variably set in response to the estimated residual capacity value.

Preferably, the hybrid vehicle further includes a display unit for causing a driver to visually recognize vehicle information. The display unit includes a display area for displaying a vehicle speed range in which traveling of the vehicle using only the output of the rotating electric machine is applicable, at least based on the upper limit vehicle speed set by the upper limit vehicle speed setting unit.

Alternatively, preferably, the hybrid vehicle further includes a power generation mechanism configured to generate charging power for the power storage device using the output of the internal combustion engine. In the second traveling mode, if the residual capacity of the power storage device becomes lower than the control range, the traveling control unit controls the rotating electric machine and the internal combustion engine such that the charging power for the power storage device is generated by the power generation mechanism.

According to another aspect of the present invention, provided is a control method for a hybrid vehicle including a rotating electric machine and an internal combustion engine each for generating a vehicle driving force, a power storage device mounted in the vehicle, a power control unit for performing power conversion between the power storage device and the rotating electric machine, and an external charging unit for charging the power storage device by a power source external to the vehicle. The control method includes the steps of: selecting, in response to a state of charge of the power storage device, one of a first traveling mode in which the internal combustion engine and the rotating electric machine are used such that the vehicle travels mainly using an output of the rotating electric machine irrespective of a residual capacity of the power storage device, and a second traveling mode in which the internal combustion engine and the rotating electric machine are used such that the vehicle travels with the residual capacity of the power storage device being maintained within a predetermined control range; and controlling traveling of the vehicle to use both of outputs of the internal combustion engine and the rotating electric machine, if the upper limit vehicle speed is exceeded, in response to the selected traveling mode. The step of setting sets the upper limit vehicle speed in the first traveling mode to be lower than the upper limit vehicle speed in the second traveling mode.

Preferably, the step of selecting controls the rotating electric machine and the internal combustion engine in the first traveling mode such that, if the hybrid vehicle has a torque and a vehicle speed inside a first region, the vehicle travels using only the output of the rotating electric machine, and if the hybrid vehicle has a torque and a vehicle speed outside the first region, the vehicle travels using both of the outputs of the rotating electric machine and the internal combustion engine, and controls the rotating electric machine and the internal combustion engine in the second traveling mode such that, if the hybrid vehicle has a torque and a vehicle speed inside a second region, the vehicle travels using only the output of the rotating electric machine, and if the hybrid vehicle has a torque and a vehicle speed outside the second region, the vehicle travels using both of the outputs of the rotating electric machine and the internal combustion engine. The first and second regions are set reflecting the upper limit vehicle speed set by the step of setting.

Preferably, in the first traveling mode, the step of setting variably sets the upper limit vehicle speed within a range lower than the upper limit vehicle speed in the second traveling mode, based on at least one of the state of charge and an input/output current of the power storage device.

More preferably, the control method further includes the steps of: calculating an estimated residual capacity value of the power storage device based on an output of a sensor arranged in the power storage device; calculating a current load parameter indicating a thermal load on equipment, based on the input/output current of the power storage device; and variably setting an output power upper limit value of the power storage device based on the calculated estimated residual capacity value and current load parameter. In the first traveling mode, the step of setting the upper limit vehicle speed variably sets the upper limit vehicle speed, at least based on the calculated current load parameter.

More preferably, the step of setting the upper limit vehicle speed includes the steps of variably setting a first upper limit speed in response to the current load parameter, variably setting a second upper limit speed in response to the estimated residual capacity value, and setting the upper limit vehicle speed in the first traveling mode in accordance with a minimum value of the first upper limit speed and the second upper limit speed.

Preferably, the hybrid vehicle further includes a display unit for causing a driver to visually recognize vehicle information. The control method further includes the step of displaying a vehicle speed range in which traveling of the vehicle using only the output of the rotating electric machine is applicable on the display unit, at least based on the set upper limit vehicle speed.

Alternatively, preferably, the hybrid vehicle further includes a power generation mechanism configured to generate charging power for the power storage device using the output of the internal combustion engine. In the second traveling mode, if the residual capacity of the power storage device becomes lower than the control range, the step of controlling controls the rotating electric machine and the internal combustion engine such that the charging power for the power storage device is generated by the power generation mechanism.

Advantageous Effects of Invention

According to the present invention, an upper limit vehicle speed for traveling of a vehicle using only an output of a rotating electric machine can be appropriately set to improve energy efficiency and emission property of a hybrid vehicle.

DETAILED DESCRIPTION

Figure 1:
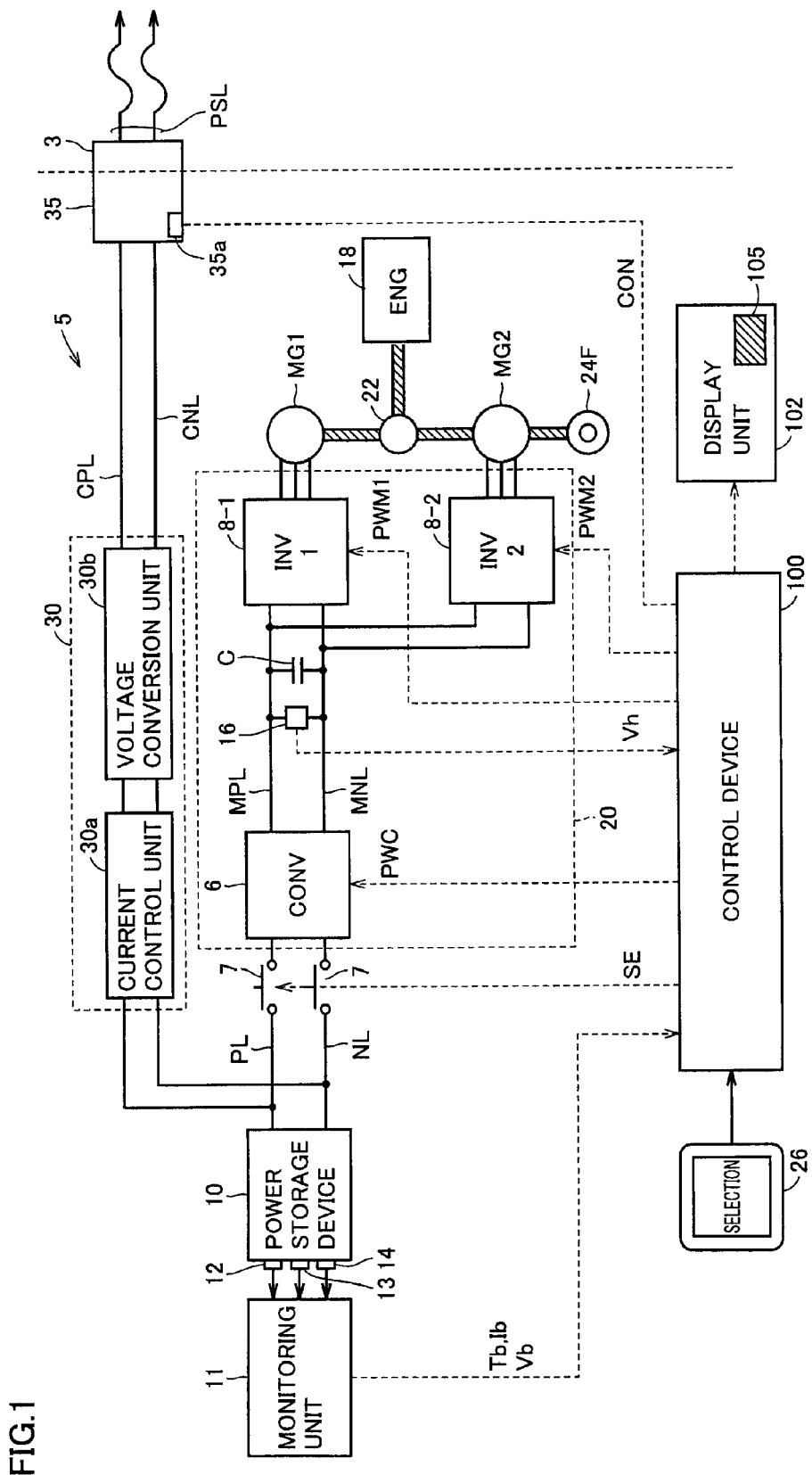
FIG. 1 is a block diagram showing a schematic configuration of a hybrid vehicle in accordance with Embodiment 1 of the present invention.

Hereinafter, embodiments of the present invention will be described in detail with reference to the drawings, in which identical or corresponding parts will be designated by the same reference numerals, and the description thereof will not be repeated in principle.

Embodiment 1

FIG. 1 is a block diagram showing a schematic configuration of a hybrid vehicle 5 in accordance with Embodiment 1 of the present invention.

Referring to FIG. 1, hybrid vehicle 5 is equipped with an internal combustion engine (engine) 18 and motor generators MG1, MG2, and travels controlling outputs thereof at an optimal ratio. Hybrid vehicle 5 is further equipped with a power storage device 10.

Power storage device 10 is a rechargeable power storage element, and is typically composed of a secondary battery such as a lithium ion battery and a nickel hydride battery. Alternatively, power storage device 10 may be composed of a power storage element other than a secondary battery, such as an electric double-layer capacitor. FIG. 1 shows a system configuration related to charging/discharging of power storage device 10 in hybrid vehicle 5.

In a state where a system of hybrid vehicle 5 is started up (hereinafter also referred to as an "IG on state"), power storage device 10 can supply and receive electric power to and from motor generators MG1, MG2 through power conversion by a power control unit 20.

Further, while the system of hybrid vehicle 5 is stopped (hereinafter also referred to as an "IG off state"), power storage device 10 can be charged by a power source external to the vehicle (not shown, hereinafter also referred to as an "external power source") through electrical connection via a connector portion 3. Instead of or in addition to a commercial power source, the external power source to be supplied to hybrid vehicle 5 via connector portion 3 may be, for example, electric power generated by a solar battery panel installed on the roof of a house or the like. Details of charging of power storage device 10 by the external power source (hereinafter also referred to as "external charging") will be described later.

A monitoring unit 11 outputs a temperature Tb, a voltage Vb, and a current Ib as values detecting the state of power storage device 10, based on outputs of a temperature sensor 12, a voltage sensor 13, and a current sensor 14 provided in power storage device 10. It is to be noted that temperature sensor 12, voltage sensor 13, and current sensor 14 comprehensively refer to temperature sensors, voltage sensors, and current sensors provided in power storage device 10, respectively. That is, it is noted for confirmation that, actually, a plurality of temperature sensors 12, voltage sensors 13, and/or current sensors 14 are generally provided.

Engine 18, motor generator MG1, and motor generator MG2 are mechanically coupled via a motive power split mechanism 22. In response to a traveling situation of hybrid vehicle 5, a driving force is distributed and combined among the three components via motive power split mechanism 22, and consequently driving wheels 24F are driven.

Figure 2:
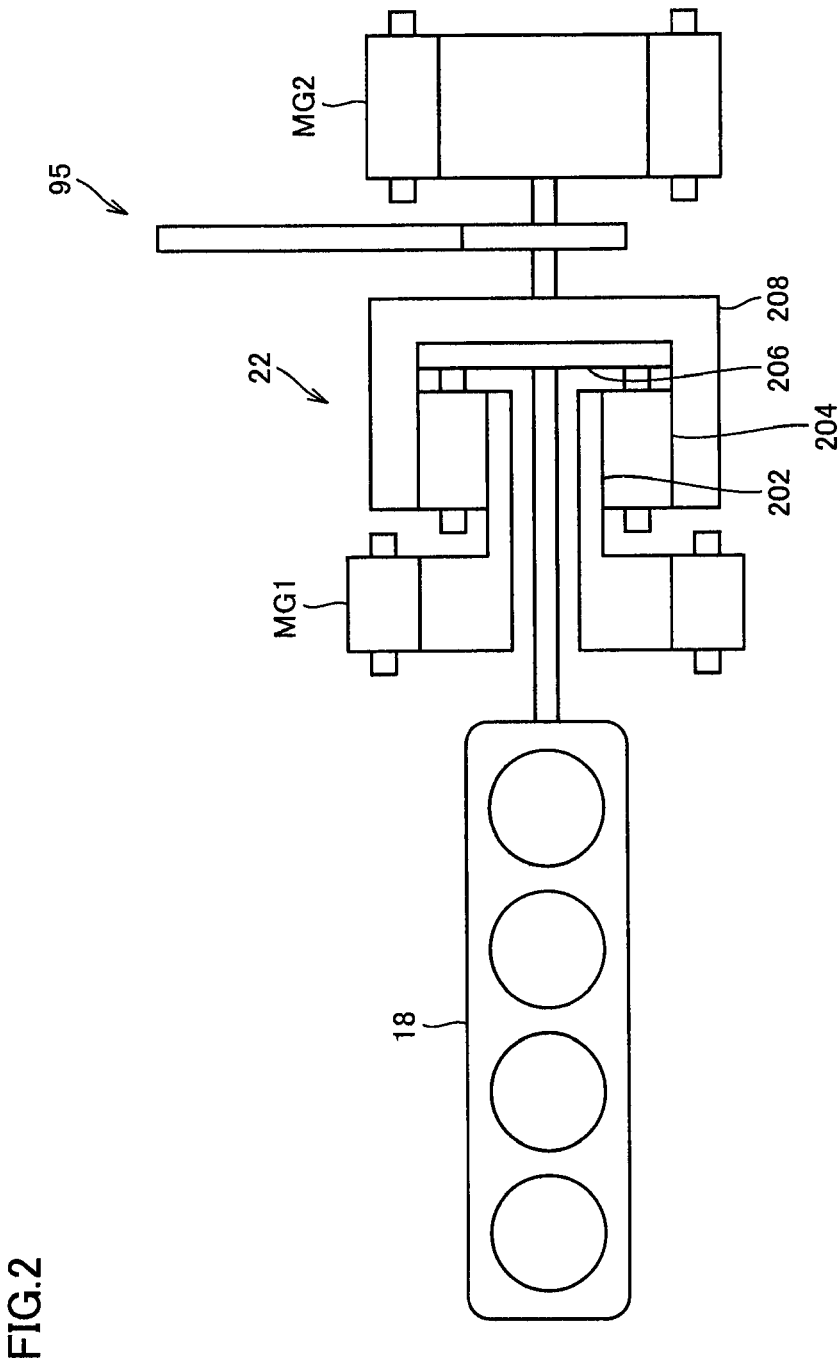
FIG. 2 is a schematic configuration diagram of a motive power split mechanism shown in FIG. 1.

Referring to FIG. 2, motive power split mechanism 22 will be further described. Motive power split mechanism 22 is composed of a planetary gear including a sun gear 202, a pinion gear 204, a carrier 206, and a ring gear 208.

Pinion gear 204 engages sun gear 202 and ring gear 208. Carrier 206 supports pinion gear 204 to be rotatable. Sun gear 202 is coupled to a rotation shaft of motor generator MG1. Carrier 206 is coupled to a crank shaft of engine 18. Ring gear 208 is coupled to a rotation shaft of motor generator MG2 and a reduction mechanism 95.

Figure 3:
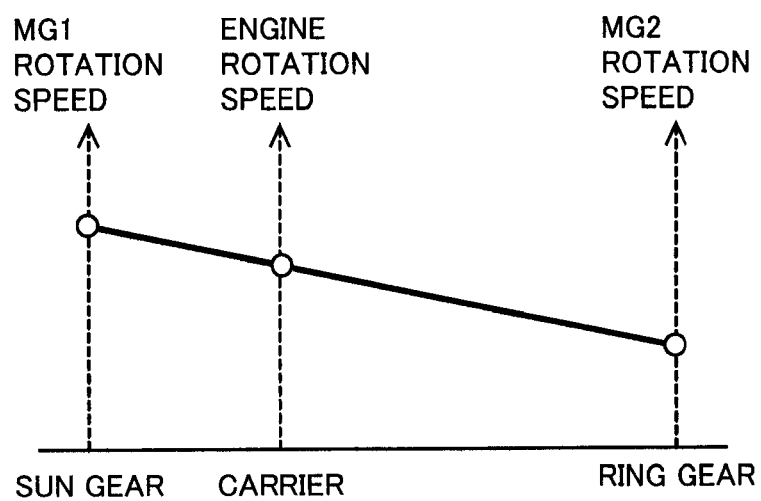
FIG. 3 is a nomograph indicating the relationship among rotation speeds of an engine, MG1, and MG2 shown in FIG. 1.

Since engine 18, motor generator MG1, and motor generator MG2 are coupled via motive power split mechanism 22 composed of a planetary gear, rotation speeds of engine 18, motor generator MG1, and motor generator MG2 have the relationship such that they are connected by a straight line in a nomograph, as shown in FIG. 3.

During traveling of hybrid vehicle 5, motive power split mechanism 22 splits a driving force generated by operating engine 18 into two, distributes one driving force toward motor generator MG1, and distributes the other driving force to motor generator MG2. The driving force distributed from motive power split mechanism 22 toward motor generator MG1 is used for an operation of generating electric power. On the other hand, the driving force distributed toward motor generator MG2 is combined with a driving force generated by motor generator MG2 and used to drive driving wheels 24F.

Thus, in hybrid vehicle 5, selection can be made between motor traveling in which engine 18 is stopped and only an output of motor generator MG2 is used, and hybrid traveling in which engine 18 is operated and both of outputs of engine 18 and motor generator MG2 are used.

Referring to FIG. 1 again, hybrid vehicle 5 further includes power control unit 20. Power control unit 20 is configured to be capable of performing bidirectional power conversion between motor generators MG1, MG2 and power storage device 10. Power control unit 20 includes a converter (CONV) 6, and an inverter (INV1) 8-1 and an inverter (INV2) 8-2 corresponding to motor generators MG1 and MG2, respectively.

Converter (CONV) 6 is configured to be capable of performing bidirectional direct current (DC) voltage conversion between power storage device 10 and a positive bus MPL which transfers a DC link voltage of each of inverters 8-1, 8-2. That is, an input/output voltage of power storage device 10 and a DC voltage between positive bus MPL and a negative bus MNL are boosted or bucked bidirectionally. Buck/Boost operations in converter 6 are respectively controlled in accordance with a switching command PWC from control device 100. Further, a smoothing capacitor C is connected between positive bus MPL and negative bus MNL. The DC voltage between positive bus MPL and negative bus MNL is sensed by a voltage sensor 16.

Inverter 8-1 and inverter 8-2 perform bidirectional power conversion between DC power of positive bus MPL and negative bus MNL and alternating current (AC) power to be input to or output from motor generators MG1 and MG2. Mainly, in response to a switching command PWM1 from control device 100, inverter 8-1 converts AC power generated by motor generator MG1 into DC power, and supplies it to positive bus MPL and negative bus MNL. On the other hand, in response to a switching command PWM2 from control device 100, inverter 8-2 converts DC power supplied through positive bus MPL and negative bus MNL into AC power, and supplies it to motor generator MG2. That is, in hybrid vehicle 5, motor generator MG2 is configured to generate a vehicle driving force by receiving electric power from power storage device 10. Further, motor generator MG1 is configured to generate charging power for power storage device 10 using the output of engine 18.

A system main relay 7 inserted into and connected with a positive line PL and a negative line NL is provided between power storage device 10 and power control unit 20. System main relay 7 is turned on/off in response to a relay control signal SE from control device 100.

Control device 100 typically includes an electronic control unit (ECU) mainly composed of a CPU (Central Processing Unit), a storage unit such as a RAM (Random Access Memory) and a ROM (Read Only Memory), and an input/output interface. Control device 100 performs control related to traveling of the vehicle and external charging, by the CPU reading a program stored beforehand in the ROM or the like from the RAM and executing the same. It is to be noted that at least a portion of the ECU may be configured to perform predetermined numerical/logical computation processing using hardware such as an electronic circuit.

As examples of information to be input to control device 100, FIG. 1 illustrates temperature Tb, voltage Vb, and current Ib of power storage device 10 from monitoring unit 11, and a system voltage Vh from voltage sensor 16 arranged between lines of positive bus MPL and negative bus MNL. Since a secondary battery is typically applied as power storage device 10 as described above, temperature Tb, voltage Vb, and current Ib of power storage device 10 will be hereinafter also referred to as a battery temperature Tb, a battery voltage Vb, and a battery current Ib, respectively.

Further, control device 100 continuously estimates the SOC of power storage device 10. The SOC represents a charged amount (amount of residual charge) relative to the fully charged state of power storage device 10, and is indicated, as an example, by a ratio of a charged amount at present to a fully charged capacity (0 to 100%).

Here, a configuration for external charging will be described.

Hybrid vehicle 5 further includes a connector receiving portion 35 and an external charging unit 30 for charging power storage device 10 by the external power source.

In order to externally charge power storage device 10, connector portion 3 is coupled to connector receiving portion 35, and thereby electric power from the external power source is supplied to external charging unit 30 through a positive charge line CPL and a negative charge line CNL. Further, connector receiving portion 35 includes a coupling detection sensor 35a for detecting a state of coupling between connector receiving portion 35 and connector portion 3, and control device 100 detects that a state where power storage device 10 can be charged by the external power source has been attained, based on a coupling signal CON from coupling detection sensor 35*a*. It is to be noted that the present embodiment illustrates a case where a single-phase commercial AC power source is employed as the external power source.

Connector portion 3 constitutes a coupling mechanism for supplying the external power source, typically such as a commercial power source, to hybrid vehicle 5. Connector portion 3 is coupled to a charge station (not shown) provided with the external power source, through a power line PSL formed of a cab tire cable or the like. During external charging, connector portion 3 is coupled to hybrid vehicle 5, and thereby electrically connects the external power source to external charging unit 30 mounted in hybrid vehicle 5. On the other hand, hybrid vehicle 5 is provided with connector receiving portion 35 for receiving the external power source coupled to connector portion 3.

External charging unit 30 is a device for charging power storage device 10 by receiving the electric power from the external power source, and is arranged between positive and negative lines PL and NL and positive and negative charge lines CPL and CNL.

Further, external charging unit 30 includes a current control unit 30*a* and a voltage conversion unit 30*b*, and converts the electric power from the external power source into electric power suitable for charging power storage device 10. Specifically, voltage conversion unit 30*b* is a device for converting a supply voltage of the external power source into a voltage suitable for charging power storage device 10, and is typically composed of a winding transformer having a predetermined voltage transformation ratio, an AC-AC switching regulator, or the like. Further, current control unit 30*a* rectifies an AC voltage converted by voltage conversion unit 30*b* to generate a DC voltage, and controls a charging current to be supplied to power storage device 10 in accordance with a charging current command from control device 100. Current control unit 30*a* is typically composed of a single-phase bridge circuit or the like. It is to be noted that, instead of the configuration including current control unit 30*a* and voltage conversion unit 30*b*, external charging unit 30 may be implemented using an AC-DC switching regulator or the like.

It is to be noted that, instead of the configuration shown in FIG. 1, the external power source may be received by a configuration in which electric power is supplied by means of electromagnetic coupling without contact between the external power source and the vehicle. Specifically, it is possible to apply a configuration in which a primary coil is provided on an external power source side and a secondary coil is provided on a vehicle side, and electric power is supplied utilizing mutual inductance between the primary coil and the secondary coil. Thus, in applying the present invention, the configuration for externally charging the hybrid vehicle is not particularly limited.

Since power storage device 10 can be externally charged in hybrid vehicle 5 as described above, it is preferable in terms of energy efficiency that the vehicle travels with engine 18 being maintained at a stopped state as much as possible. Therefore, hybrid vehicle 5 selects one of two traveling modes, that is, an EV (Electric Vehicle) mode and an HV (Hybrid Vehicle) mode, for traveling.

Until the SOC of power storage device 10 becomes lower than a predetermined mode determination value, hybrid vehicle 5 selects the EV mode, and travels mainly using only the driving force from motor generator MG2. Since there is no need to maintain the SOC in the EV mode, an operation of generating electric power in motor generator MG1 by receiving the driving force of engine 18 is basically not performed.

It is to be noted that, although the EV mode is intended to improve a fuel consumption rate by maintaining engine 18 at the stopped state, engine 18 is allowed to be started up if a request for a driving force for acceleration or the like is provided from a driver, if a request unrelated to the request for a driving force, such as a request for catalyst warm-up or air conditioning, is provided, if other conditions are satisfied, or the like.

If the SOC of power storage device 10 is reduced to the mode determination value during the EV mode, the traveling mode is switched to the HV mode. In the HV mode, power generation by motor generator MG1 is controlled such that the SOC of power storage device 10 is maintained within a predetermined control range. That is, engine 18 is also started for operation in response to the start of power generation by motor generator MG1. It is to be noted that a portion of the driving force generated by operating engine 18 may be used for traveling of hybrid vehicle 5.

In the HV mode, control device 100 determines target values for the rotation speed of engine 18, a power generation amount of motor generator MG1, and a torque of motor generator MG2, based on signals from sensors, the traveling situation, an accelerator pedal position, and the like, in order to optimize overall fuel efficiency.

Further, in hybrid vehicle 5, a traveling mode can also be selected by a user operating a selection switch 26 provided in the vicinity of a driver seat. That is, the user can forcibly select the HV mode or the EV mode by inputting an operation to selection switch 26.

Hybrid vehicle 5 further includes a display unit 102 for causing the driver to visually recognize vehicle information. Display unit 102 is typically composed of a display panel provided in front of the driver. For example, indicators indicating various types of information, such as a speedometer for indicating a vehicle speed and a fuel gauge indicating a residual fuel amount, are displayed in display unit 102. Preferably, display unit 102 is provided with a display area 105 for displaying a vehicle speed range in which hybrid vehicle 5 can perform motor traveling, as described later.

Concerning the correspondence between the embodiment of the present invention shown in FIG. 1 and the invention of the present application, power storage device 10 corresponds to a "power storage device", motor generator MG2 corresponds to a "rotating electric machine", engine 18 corresponds to an "internal combustion engine", and motor generator MG1 corresponds to a "power generation mechanism". Further, the "EV mode" corresponds to a "first traveling mode", and the "HV mode" corresponds to a "second traveling mode".

Figure 4:
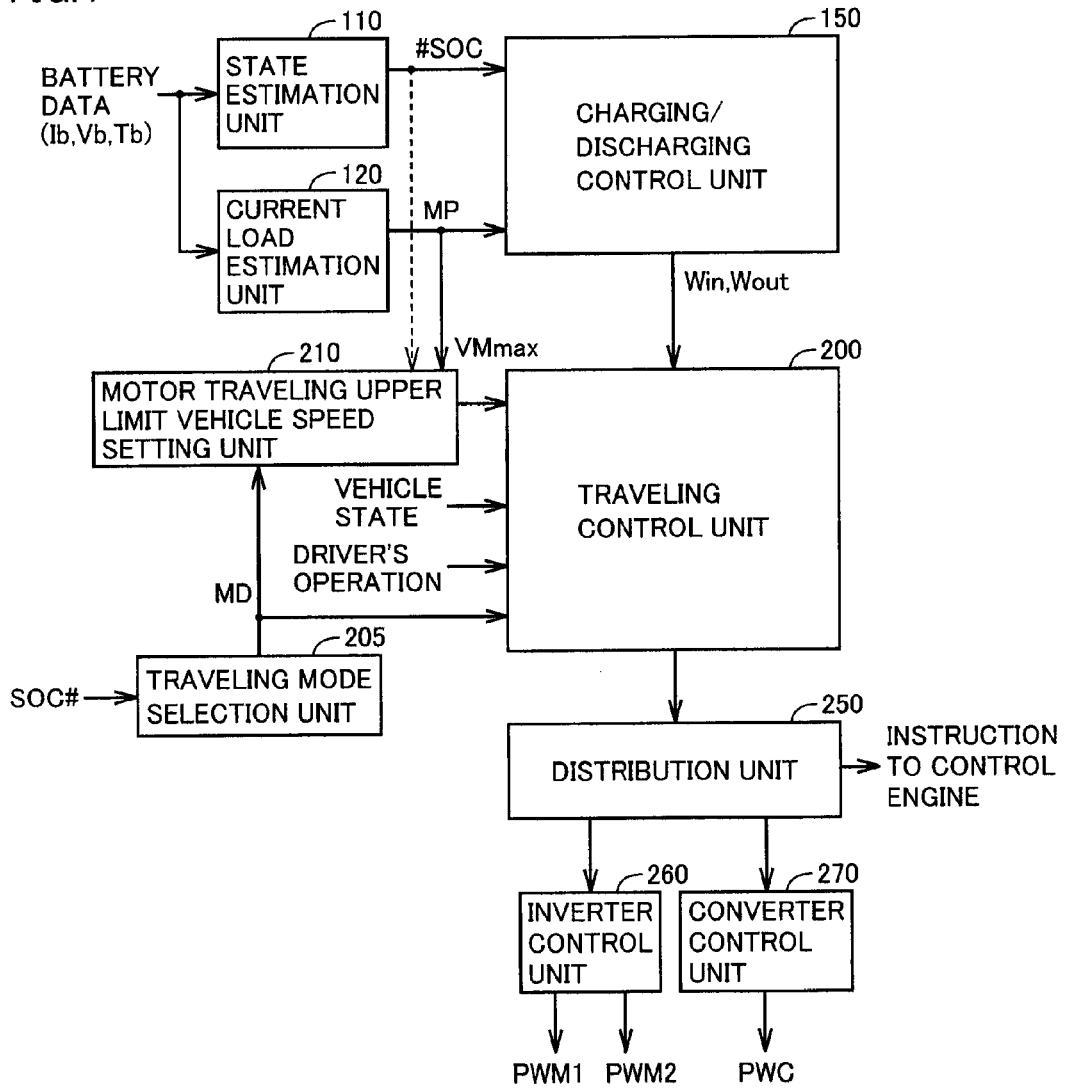
FIG. 4 is a functional block diagram illustrating traveling control in the hybrid vehicle in accordance with Embodiment 1 of the present invention.

FIG. 4 is a functional block diagram illustrating traveling control in the hybrid vehicle in accordance with Embodiment 1 of the present invention. Each functional block shown in FIG. 4 can be implemented by control device 100 executing software processing in accordance with a preset program. Alternatively, it is also possible to configure a circuit (hardware) having a function corresponding to the functional block inside control device 100.

Referring to FIG. 4, a state estimation unit 110 estimates the SOC of power storage device 10 based on battery data (Tb, Ib, Vb) from monitoring unit 11. For example, state estimation unit 110 sequentially computes an estimated SOC value (#SOC) of power storage device 10 based on an integrated value of a charged/discharged amount of power storage device 10. The integrated value of the charged/discharged amount is obtained by time-integrating the product of battery current Ib and battery voltage Vb (i.e., power). Alternatively, the estimated SOC value (#SOC) may be calculated based on the relationship between an open circuit voltage (OCV) and the SOC.

A current load estimation unit 120 calculates a current load parameter MP indicating a thermal load on equipment due to passage of battery current Ib, based on battery current Ib. In the present embodiment, by reflecting current load parameter MP to control of charging/discharging of power storage device 10, heat generation in equipment constituting an electric system (i.e., parts constituting power control unit 20, such as a reactor, a capacitor, and a switching element) is controlled not to become excessive.

Figure 5:
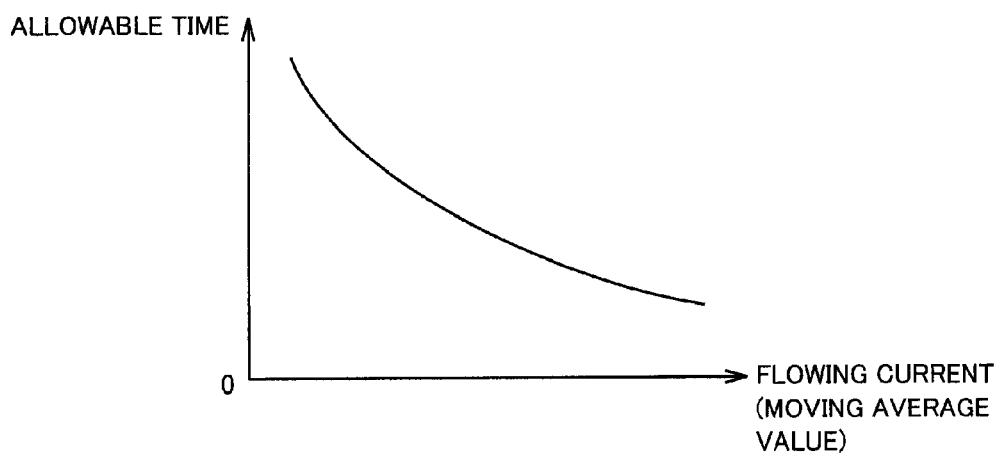
FIG. 5 is a conceptual diagram illustrating design of a thermal load on equipment.

As shown in FIG. 5, a thermal load on each equipment is generally designed by defining a limit line indicating an allowable time with respect to a moving average value of a flowing current. That is, in accordance with the level of the flowing current, an allowable time for which the current can continuously flow is designed beforehand, and charging/discharging of power storage device 10 is limited as necessary such that a load indicated by the product of the flowing current and a flowing time does not exceed the limit line.

In the electric system shown in FIG. 1, a passing current of each equipment has a magnitude in accordance with the magnitude of battery current Ib. Therefore, current load parameter MP is defined as a parameter for quantitatively evaluating the thermal load on each equipment due to passage of battery current Ib. Current load parameter MP is calculated by smoothing a time-shift of a square value of battery current Ib using a low pass filter. For example, by employing a low pass filter of a first-order lag system, current load parameter MP is calculated for each regular control cycle, in accordance with the following equation (1):

$$MP(n) = (K-1)/K \cdot MP(n-1) + Ib^2(n)/K \quad (1)$$

In equation (1), MP(n) is a calculated value in a present control cycle, and MP(n−1) is a calculated value in a previous control cycle. $Ib^2(n)$ is a square value of battery current Ib in the present control cycle. A coefficient K is a value determined by a time constant of the first-order lag and the control cycle. The greater coefficient K is, the greater the time constant is. The greater the time constant is, the greater a change in current load parameter MP with respect to a change in the square value of battery current Ib is smoothed. It is to be noted that, in the case of a large current, the time constant is preferably set to a value lower than usual, for evaluation of the thermal load. Further, in the case of heat dissipation (MP(n−1)>$Ib^2(n)$), the time constant is set to a value lower than that in the case of heat generation (MP(n−1)<$Ib^2(n)$).

Referring to FIG. 4 again, a traveling mode selection unit 205 is configured to select one of the HV mode and the EV mode in response to the SOC of power storage device 10.

Figure 6:
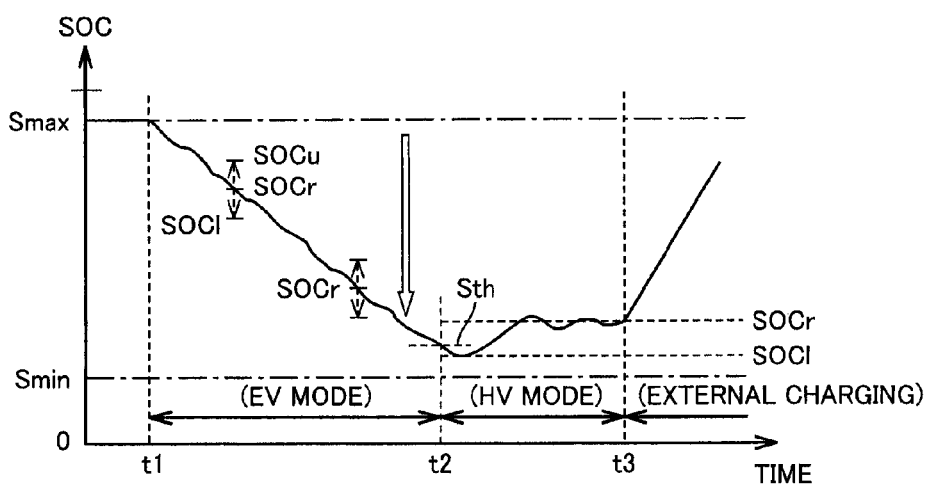
FIG. 6 is a waveform diagram illustrating one example of traveling mode selection with respect to SOC shifts in the hybrid vehicle in accordance with Embodiment 1.

FIG. 6 shows one example of traveling mode selection with respect to SOC shifts in hybrid vehicle 5.

Referring to FIG. 6, in hybrid vehicle 5, when the vehicle starts traveling (at time t1), power storage device 10 has been externally charged to almost an SOC upper limit value Smax. When an ignition switch is turned on and hybrid vehicle 5 starts traveling, the EV mode is selected because the estimated SOC value (#SOC) is higher than a mode determination value Sth. It is to be noted that the SOC control range at each timing ranges from a control lower limit value SOCl to a control upper limit value SOCu. The intermediate value between control lower limit value SOCl and control upper limit value SOCu is a control central value SOCr. As described above, if the SOC becomes lower than the control range, charging of power storage device 10 during traveling of the vehicle is requested.

Due to traveling in the EV mode, the SOC of power storage device 10 is gradually reduced. During the EV mode, control central value SOCr in the SOC control range is set corresponding to the estimated SOC value (#SOC) at the present moment. That is, in the EV mode, as the SOC is reduced, the SOC control range also becomes lower. As a result, during the EV mode, engine 18 is not started for the purpose of charging power storage device 10.

If the estimated SOC value (#SOC) is reduced to mode determination value Sth (at time t2), the traveling mode shifts from the EV mode to the HV mode. When the traveling mode shifts to the HV mode, control central value SOCr is set to a constant value for the HV mode. Thereby, control lower limit value SOCl is also maintained constant. As a result, in the HV mode, if the SOC is reduced, engine 18 (FIG. 1) is started for operation, and power storage device 10 is charged using electric power generated by motor generator MG1. Consequently, the SOC starts increasing and is maintained within the SOC control range (SOCl to SOCu).

If the HV mode is forcibly selected by operating selection switch 26 during the EV mode (#SOC>Sth), charging/discharging of power storage device 10 is controlled to maintain the SOC at that moment. That is, the SOC control range is set to fix control central value SOCr at the estimated SOC value (#SOC) when selection switch 26 is operated.

Then, when hybrid vehicle 5 finishes traveling, the driver couples connector portion 3 (FIG. 1) to hybrid vehicle 5, and thus external charging is started (at time t3). Thereby, the SOC of power storage device 10 is increased.

Referring to FIG. 4 again, in a period when the estimated SOC value (#SOC) estimated by state estimation unit 110 is higher than mode determination value Sth, traveling mode selection unit 205 selects the EV mode. On the other hand, if the estimated SOC value is reduced to mode determination value Sth while the EV mode is performed, traveling mode selection unit 205 switches the traveling mode from the EV mode to the HV mode. However, when selection switch 26 is operated by the user, traveling mode selection unit 205 forcibly selects the HV mode or the EV mode in accordance with the user's operation. Traveling mode selection unit 205 outputs a traveling mode signal MD indicating which of the EV mode and the HV mode is selected.

A charging/discharging control unit 150 sets an input power upper limit value Win and an output power upper limit value Wout based on the state of power storage device 10. As common control of charging/discharging, if the estimated SOC value (#SOC) is reduced, output power upper limit value Wout is limited to be less than a default value, whereas if the estimated SOC value (#SOC) is increased, input power upper limit value Win is limited to be less than a default value. Further, if battery temperature Tb is changed to a low temperature or a high temperature, input power upper limit value Win and output power upper limit value Wout are suppressed when compared with those at ordinary temperature.

In addition, charging/discharging control unit 150 sets input power upper limit value Win and output power upper limit value Wout by further reflecting current load parameter MP calculated by current load estimation unit 120. For example, if current load parameter MP is lower than a determination value (threshold value) Mt, charging/discharging control unit 150 does not limit output power upper limit value Wout from the aspect of the current load (thermal load due to the current), whereas if current load parameter MP exceeds determination value Mt, charging/discharging control unit 150 limits output power upper limit value Wout.

As is understood from equation (1) for calculating current load parameter MP, a certain time lag is required before a reduction in battery current Ib is reflected to current load parameter MP. Therefore, once current load parameter MP exceeds determination value Mt, even if battery current Ib is reduced by limiting output power from power storage device 10, it takes a certain time before current load parameter MP is decreased. During this period, limitation on output power upper limit value Wout is continued.

It is not necessary to use all of the SOC of power storage device 10, battery temperature Tb, and battery current Ib (current load parameter MP) to set input power upper limit value Win and output power upper limit value Wout. Charging/discharging control unit 150 is configured to variably set input power upper limit value Win and output power upper limit value Wout, based on at least one of the SOC of power storage device 10 and battery current Ib to be reflected to current load parameter MP.

Further, charging/discharging control unit 150 determines whether or not power storage device 10 should be charged during traveling of the vehicle. As described above, in the EV mode, a request to charge power storage device 10 is not generated. In the HV mode, a request to charge power storage device 10 is generated in accordance with the relationship between the estimated SOC value (#SOC) and the SOC control range (SOCl to SOCu).

A motor traveling upper limit vehicle speed setting unit 210 sets an upper limit vehicle speed VMmax in motor traveling using only the output of motor generator MG2, for each of the EV mode and the HV mode, based on traveling mode signal MD.

A traveling control unit 200 calculates a vehicle driving force and a vehicle braking force required for entire hybrid vehicle 5, in response to a vehicle state of hybrid vehicle 5 and a driver's operation. The driver's operation includes an amount of depression of an accelerator pedal (not shown), a position of a shift lever (not shown), an amount of depression of a brake pedal (not shown), and the like.

Then, traveling control unit 200 controls output distribution among motor generators MG1, MG2 and engine 18 to achieve the required vehicle driving force or vehicle braking force. In accordance with the control on output distribution, output requests for motor generators MG1, MG2 and an output request for engine 18 are determined. As part of the control on output distribution, one of motor traveling and engine used traveling is selected. Further, the output requests for motor generators MG1, MG2 are set by placing a limitation such that charging/discharging of power storage device 10 is not performed within a power range in which power storage device 10 can be charged/discharged (Win to Wout). That is, when it is not possible to ensure the output power of power storage device 10, the output by motor generator MG2 is limited. Further, if a request to charge power storage device 10 is generated from charging/discharging control unit 150, the output of engine 18 to be used to generate electric power in motor generator MG1 is ensured.

A distribution unit 250 computes torques and rotation speeds of motor generators MG1, MG2, in response to the output requests for motor generators MG1, MG2 set by traveling control unit 200. Then, distribution unit 250 outputs control commands for the torques and rotation speeds to an inverter control unit 260, and outputs a control command value for DC voltage Vh to a converter control unit 270.

On the other hand, distribution unit 250 generates an instruction to control the engine which indicates engine power and a target engine rotation speed determined by traveling control unit 200. In accordance with the instruction to control the engine, fuel injection, ignition timing, valve timing, and the like of engine 18 not shown are controlled.

Inverter control unit 260 generates switching commands PWM1 and PWM2 for driving motor generators MG1 and MG2, in response to the control commands from distribution unit 250. Switching commands PWM1 and PWM2 are output to inverters 8-1 and 8-2, respectively.

Converter control unit 270 generates a switching command PWC such that DC voltage Vh is controlled in accordance with the control command from distribution unit 250. By voltage conversion of converter 6 in accordance with switching command PWC, charging/discharging power for power storage device 10 is controlled.

In this way, traveling control for hybrid vehicle 5 with improved energy efficiency is achieved in response to the vehicle state and the driver's operation.

Selection of motor traveling and hybrid traveling by traveling control unit 200 will be described in detail, with reference to FIG. 7.

Figure 7:
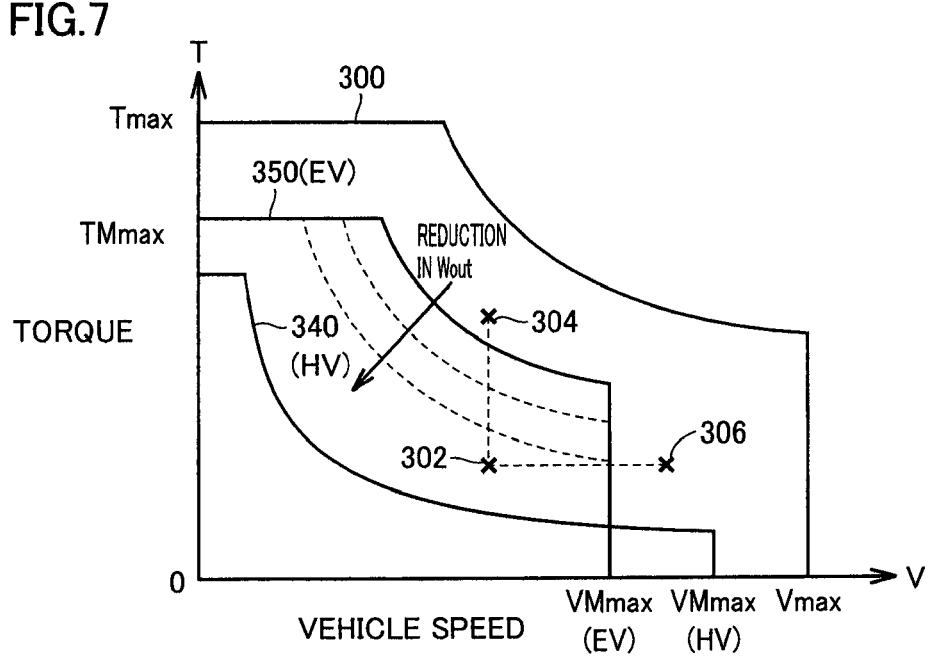
FIG. 7 is a conceptual diagram illustrating selection of motor traveling and hybrid traveling in the hybrid vehicle in accordance with Embodiment 1.

Referring to FIG. 7, the axis of abscissas represents a vehicle speed V of hybrid vehicle 5, and the axis of ordinates represents a driving torque T. Vehicle speed V and driving torque T define a maximum output line 300 of hybrid vehicle 5.

Maximum output line 300 is composed of a straight line at T=Tmax (upper limit torque), a straight line at V=Vmax (upper limit vehicle speed), and a curved line in a region of T<Tmax and V<Vmax. The curved line portion in maximum output line 300 corresponds to upper limit output power.

Maximum output lines 340 and 350 in motor traveling are defined for the HV mode and the EV mode, respectively. As with maximum output line 300, each of maximum output lines 340 and 350 is composed of straight line portions defining an upper limit torque TMmax and upper limit vehicle speed VMmax and a curved line portion defining upper limit output power, in motor traveling.

In the HV mode, if hybrid vehicle 5 has an operating point (vehicle speed, torque) inside maximum output line 340, motor traveling is selected, and the vehicle driving force is ensured using only the output of motor generator MG. On the other hand, if hybrid vehicle 5 has an operating point outside maximum output line 340, the vehicle driving force is ensured by hybrid traveling in which engine 18 is started.

In the HV mode in which the SOC is maintained, a region for motor traveling is set to be relatively small to drive engine 18 in a region with high engine efficiency. In contrast, in the EV mode, maximum output line 350 is set to be relatively large to actively select motor traveling.

For example, in the HV mode, hybrid traveling is selected at each of operating points 302 to 306. On the other hand, in the EV mode, motor traveling is selected at operating point 302. However, even in the EV mode, hybrid traveling is selected at operating point 304 where an output torque higher than that at operating point 302 is requested, because it is outside maximum output line 350. That is, engine 18 is started. Further, when a request to charge power storage device 10 is generated as described above, even if an operating point is inside maximum output line 340, 350, engine 18 is operated to be used for power generation in motor generator MG1.

The curved line portion of maximum output line 340, 350 changes in response to output power upper limit value Wout of power storage device 10. Specifically, when output power upper limit value Wout is limited, a region inside maximum output line 340, 350, that is, a region in which motor traveling is selected, is narrowed.

In particular, when output power upper limit value Wout is limited by an increase in current load parameter MP, there is a possibility that, while the EV mode is selected because of the sufficient SOC, engine 18 is frequently started. This can cause a reduction in energy efficiency of hybrid vehicle 5.

Further, when the vehicle speed increases and shifts from operating point 302 to operating point 306, hybrid traveling is selected because V>VMmax is obtained and operating point 306 is outside maximum output line 350. That is, when vehicle speed V exceeds motor traveling upper limit vehicle speed VMmax. starting of engine 18 is instructed and hybrid traveling is selected. As a result, a further increase in the output of motor generator MG2 is prohibited.

In a high rotation speed region, efficiency of motor generators MG1, MG2 (rotating electric machine) is reduced due to high iron loss. Further, at a high vehicle speed, driving resistance is increased, and thereby a high load state is likely to be caused. Thus, in motor traveling at a high vehicle speed, the energy efficiency (fuel efficiency) of hybrid vehicle 5 is deteriorated, and a current for obtaining the same output, that is, battery current Ib, is increased. Therefore, by setting motor traveling upper limit vehicle speed VMmax, vehicle traveling is controlled to avoid continuous motor traveling in a high speed region.

In the present embodiment, motor traveling upper limit vehicle speed VMmax (EV) in the EV mode is set to be lower than motor traveling upper limit vehicle speed VMmax (HV) in the HV mode.

Figure 8:
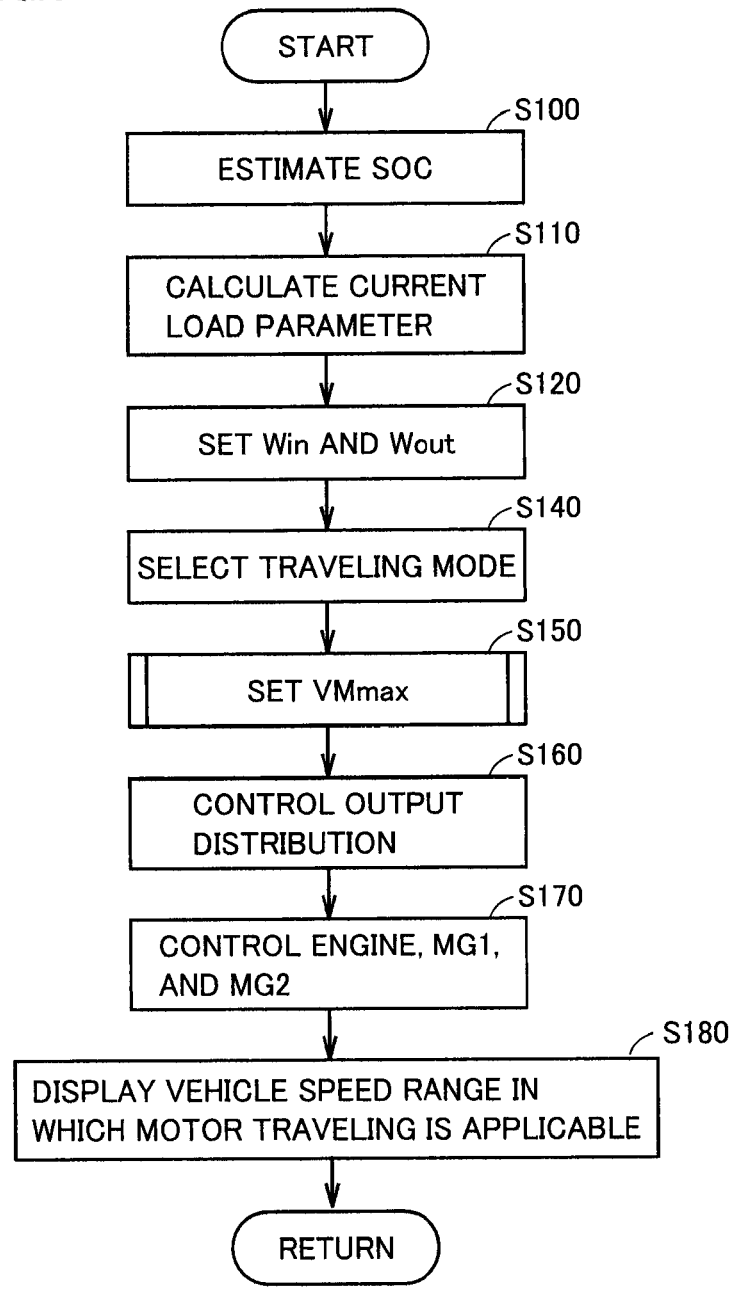
FIG. 8 is a flowchart illustrating a procedure of processing for traveling control in the hybrid vehicle in accordance with Embodiment 1.

FIG. 8 shows a procedure of processing for traveling control in hybrid vehicle 5 in accordance with the embodiment of the present invention. Processing in each step shown in FIG. 8 can be implemented by control device 100 executing a predetermined program stored beforehand, or causing a dedicated electronic circuit to operate. A series of control processing shown in FIG. 8 is repeatedly performed for each regular control cycle.

Referring to FIG. 8, by step S100, control device 100 estimates the SOC of power storage device 10. That is, in step S100, the estimated SOC value (#SOC) is calculated by the same function as that of state estimation unit 110 in FIG. 4. Further, in step S110, control device 100 calculates current load parameter MP based on battery current Ib, in accordance with (1) described above. That is, processing by step S110 corresponds to the function of current load estimation unit 120 in FIG. 4.

By step S120, control device 100 sets input power upper limit value Win and output power upper limit value Wout of power storage device 10. That is, in step S120, input power upper limit value Win and output power upper limit value Wout are variably set by the same function as that of charging/discharging control unit 150 in FIG. 4. As described above, if current load parameter MP exceeds threshold value Mt, input power upper limit value Win and output power upper limit value Wout are limited. Further, by step S140, control device 100 selects one of the HV mode and the EV mode as the traveling mode of hybrid vehicle 5, mainly based on the SOC of power storage device 10, by the same function as that of traveling mode selection unit 205 in FIG. 4.

By step S150, control device 100 sets motor traveling upper limit vehicle speed VMmax of hybrid vehicle 5, in response to the state of power storage device 10. Processing by step S150 corresponds to the function of motor traveling upper limit vehicle speed setting unit 210 in FIG. 4.

Figure 9:
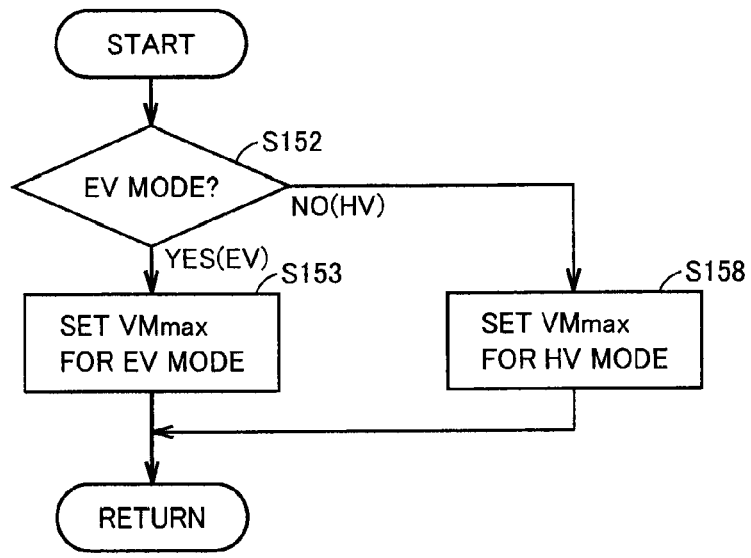
FIG. 9 is a flowchart illustrating a procedure of processing for setting a motor traveling upper limit vehicle speed in the hybrid vehicle in accordance with Embodiment 1.

FIG. 9 is a flowchart illustrating the processing by step S150 in FIG. 8 in detail.

Referring to FIG. 9, in step S152, control device 100 determines whether or not the traveling mode is the EV mode. If the traveling mode is the EV mode (YES in S152), control device 100 advances the processing to step S153. In step S153, motor traveling upper limit vehicle speed VMmax for the EV mode is set.

On the other hand, if the traveling mode is the HV mode (NO in S152), by step S158, control device 100 sets motor traveling upper limit vehicle speed VMmax for the HV mode. As described above, motor traveling upper limit vehicle speed VMmax for the HV mode is higher than motor traveling upper limit vehicle speed VMmax for the EV mode.

Referring to FIG. 8 again, by step S160, control device 100 controls output distribution among motor generators MG1, MG2, and engine 18, by the same function as that of traveling control unit 200 in FIG. 4. In the control on output distribution in step S160, maximum output lines 340, 350 are set. Then, in accordance with maximum output lines 340, 350, one of motor traveling and engine used traveling is selected, that is, whether or not engine 18 should be operated is determined. Further, output requests for motor generators MG1, MG2 and an output request for engine 18 are determined.

In step S170, control device 100 controls engine 18 and motor generators MG1, MG2, in accordance with control commands for the engine, MG1, and MG2, respectively, according to the control on output distribution in step S160.

Then, by step S180, control device 100 displays a vehicle speed range in which motor traveling is applicable, on display area 105. For example, on display area 105, an entire vehicle speed range of hybrid vehicle 5 is displayed, and the vehicle speed range in which motor traveling is applicable, of the entire vehicle speed range, is additionally displayed in a specific color (for example, green). Display area 105 may be composed using a portion (for example, a numeric panel portion) of a speedometer (not shown).

Thus, guidance information for spontaneously continuing motor traveling, that is, information for assisting so-called eco-drive, can be provided to the driver. It is to be noted that the vehicle speed range in which motor traveling is applicable can be set, for example, to be a vehicle speed range lower than motor traveling upper limit vehicle speed VMmax. As described above, the SOC and/or current load parameter MP are/is reflected to motor traveling upper limit vehicle speed VMmax. Alternatively, a vehicle speed range defined by maximum output lines 340 and 350, to which motor traveling upper limit vehicle speed VMmax is reflected, may be displayed on display area 105 to correspond to an operating point at present. Thus, the vehicle speed range in which motor traveling is applicable to be displayed on display area 105 can be determined at least based on motor traveling upper limit vehicle speed VMmax.

As has been described above, in the hybrid vehicle in accordance with Embodiment 1, in the EV mode in which electric power of power storage device 10 is actively used, motor traveling upper limit vehicle speed VMmax is set to be lower than that in the HV mode. This can prevent a situation where, due to motor traveling in the high-speed region, output power upper limit value Wout is limited by the SOC and/or current load parameter MP. That is, a period for which the vehicle can travel without limitation on output power upper limit value Wout can be ensured sufficiently. As a result, a range in which motor traveling can accommodate a driver's request for acceleration is relatively widened, and thus motor traveling can be applied for a long period of time, with the start of engine 18 being suppressed. That is, since a frequency of operating engine 18 in the EV mode can be reduced, deterioration in emission can be avoided and traveling with high energy efficiency can be performed. Consequently, motor traveling upper limit vehicle speed VMmax can be set appropriately such that opportunities for motor traveling can be ensured appropriately.

On the other hand, in the HV mode originally having a high frequency of operating engine 18, opportunities for charging power storage device 10 are provided in the region with high engine efficiency. Therefore, energy efficiency of entire hybrid vehicle 5 can be improved by allowing motor traveling up to a high vehicle speed region.

Further, by displaying the vehicle speed range in which motor traveling is applicable on display area 105, information for assisting eco-drive by applying motor traveling can be provided to the driver.

Embodiment 2

In Embodiment 2, motor traveling upper limit vehicle speed VMmax in the EV mode in the hybrid vehicle in Embodiment 1 is changed in response to the state of power storage device 10. This further prevents output power upper limit value Wout from being limited. That is, since fundamental portions of the system configuration and traveling control for the hybrid vehicle are common to those in Embodiment 1, Embodiment 2 will describe differences from Embodiment 1.

Figure 10:
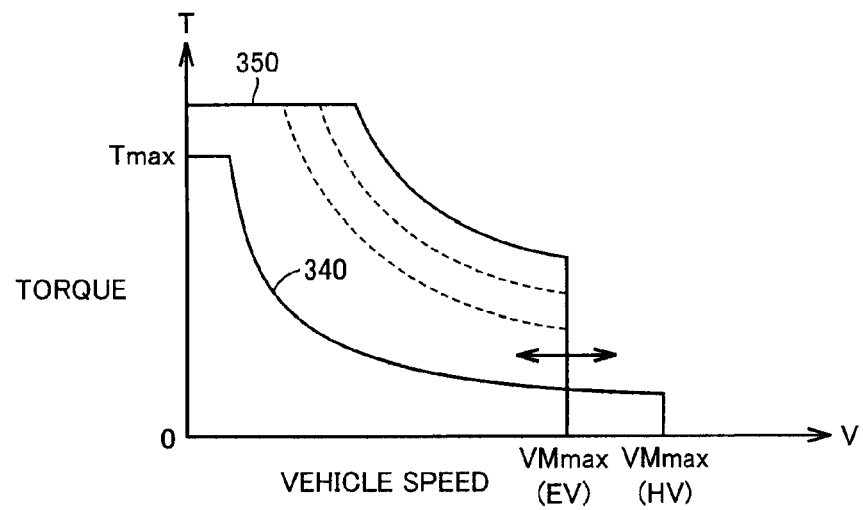
FIG. 10 is a conceptual diagram illustrating setting of a motor traveling upper limit vehicle speed in a hybrid vehicle in accordance with Embodiment 2.

FIG. 10 is a conceptual diagram illustrating setting of a motor traveling upper limit vehicle speed in a hybrid vehicle in accordance with Embodiment 2.

Referring to FIG. 10, in the hybrid vehicle in accordance with Embodiment 2, motor traveling upper limit vehicle speed VMmax in the EV mode is changed by motor traveling upper limit vehicle speed setting unit 210 (FIG. 4), in response to the state of power storage device 10. This reduces the frequency with which output power upper limit value Wout is limited.

Figure 11:
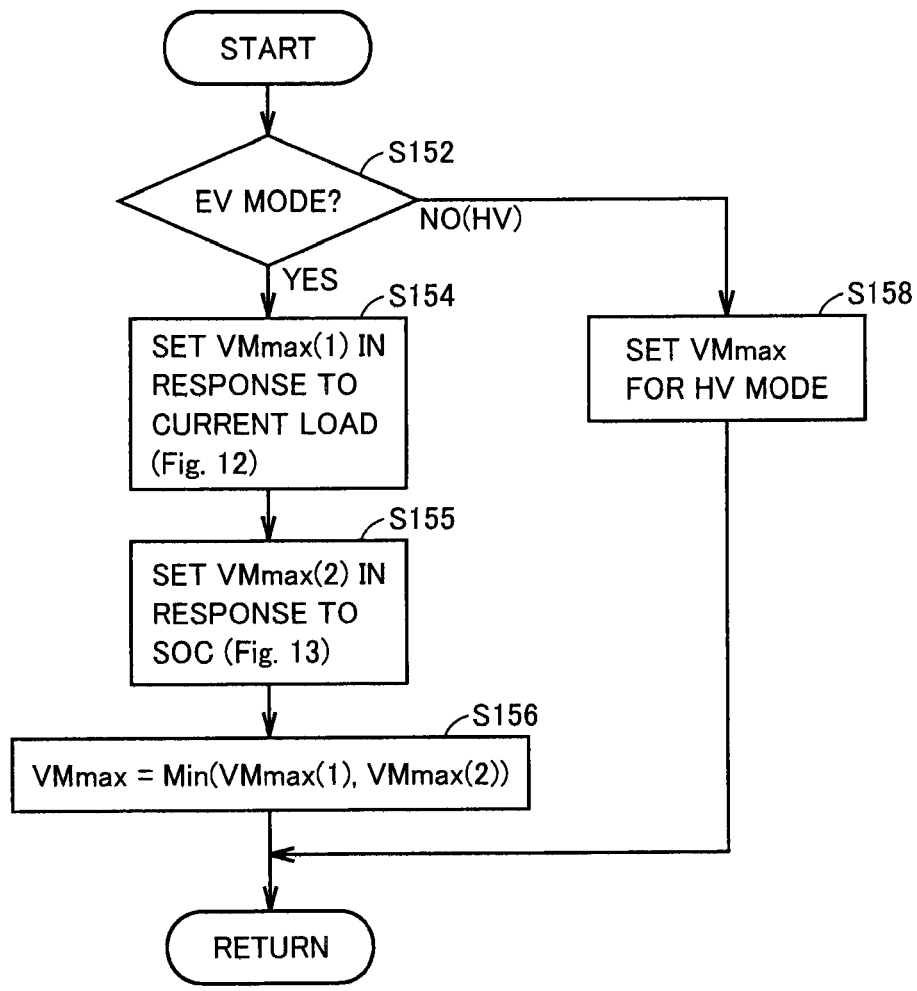
FIG. 11 is a flowchart illustrating a procedure of processing for setting the motor traveling upper limit vehicle speed in the hybrid vehicle in accordance with Embodiment 2.

FIG. 11 is a flowchart illustrating a procedure of processing for setting motor traveling upper limit vehicle speed VMmax in the hybrid vehicle in accordance with Embodiment 2. In the traveling control for the hybrid vehicle in accordance with Embodiment 2, when the flowchart shown in FIG. 8 is performed for each predetermined cycle, processing in accordance with the flowchart of FIG. 11 is performed instead of the flowchart of FIG. 9, as the processing in step S150.

Referring to FIG. 11, in step S152, control device 100 determines whether or not the traveling mode is the EV mode. If the traveling mode is the EV mode (YES in S152), control device 100 advances the processing to step S154. In step S154, a motor traveling upper limit vehicle speed VMmax(1) is set in response to current load parameter MP, in accordance with the property shown in FIG. 12.

Figure 12:
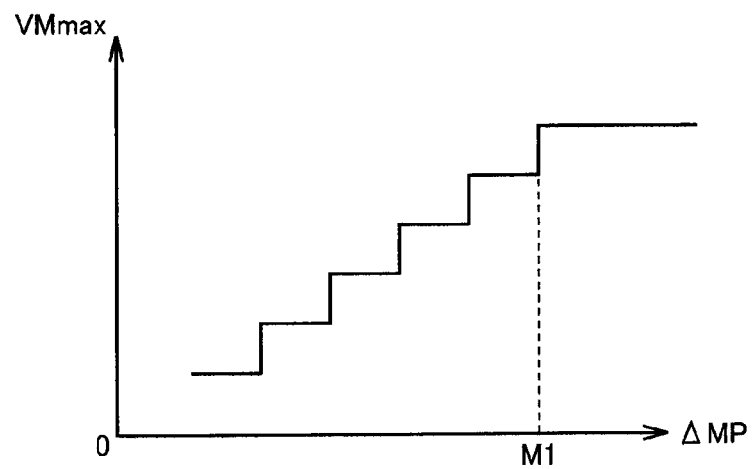
FIG. 12 is a conceptual diagram illustrating setting of the motor traveling upper limit vehicle speed with respect to a current load parameter.

Referring to FIG. 12, the axis of abscissas, ΔMP, represents a difference between current load parameter MP and threshold value Mt at which limitation on output power upper limit value Wout is started. That is, ΔMP=Mt−MP.

In the case of ΔMP>M1, that is, when current load parameter MP is sufficiently small, upper limit vehicle speed VMmax is set to a default value. On the other hand, as current load parameter MP is increased and approaches threshold value Mt, motor traveling upper limit vehicle speed VMmax is reduced in a stepwise manner. By preparing a map corresponding to FIG. 12 beforehand, motor traveling upper limit vehicle speed VMmax can be set corresponding to current load parameter MP. Alternatively, motor traveling upper limit vehicle speed VMmax may be continuously reduced corresponding to reduction in ΔMP.

Figure 13:
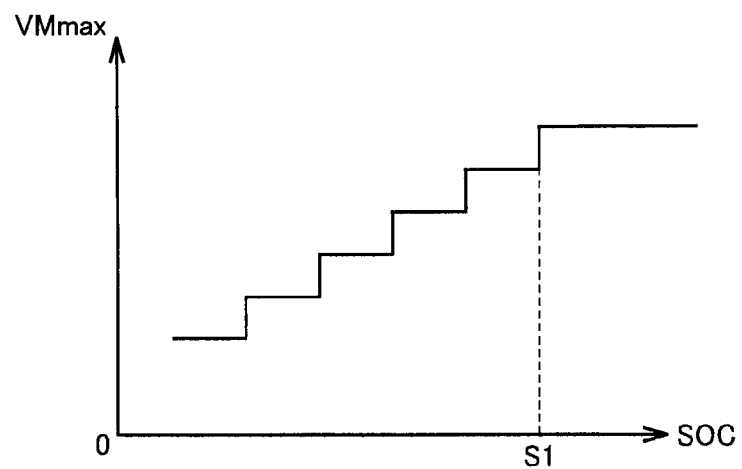
FIG. 13 is a conceptual diagram illustrating setting of the motor traveling upper limit vehicle speed with respect to the SOC of a power storage device.

Referring to FIG. 11 again, in step S155, control device 100 sets a motor traveling upper limit vehicle speed VMmax(2) in response to the estimated SOC value (#SOC), in accordance with the property shown in FIG. 13.

Referring to FIG. 13, the axis of abscissas represents the estimated SOC value (#SOC) calculated by state estimation unit 110. In a region with high SOC (#SOC>S1), upper limit vehicle speed VMmax is set to a default value. On the other hand, if #SOC becomes lower than a determination value 51, motor traveling upper limit vehicle speed VMmax is reduced in a stepwise manner corresponding to reduction in the SOC. By preparing a map corresponding to FIG. 13 beforehand, motor traveling upper limit vehicle speed VMmax can be set corresponding to the estimated SOC value (#SOC). It is to be noted that motor traveling upper limit vehicle speed VMmax may be continuously reduced corresponding to reduction in the SOC.

Referring to FIG. 11 again, by step S156, control device 100 sets a minimum value of motor traveling upper limit vehicle speeds VMmax(1) and VMmax(2), as motor traveling upper limit vehicle speed VMmax.

On the other hand, if the traveling mode is the HV mode (NO in S152), by step S158, control device 100 sets motor traveling upper limit vehicle speed VMmax for the HV mode. As described above, in the HV mode, traveling of the vehicle is performed to maintain a constant SOC of power storage device 10, that is, without actively using battery power. Therefore, motor traveling upper limit vehicle speed VMmax in the HV mode is generally fixed at a constant value with respect to the state of power storage device 10. It is to be noted that a range in which motor traveling upper limit vehicle speed VMmax is changed in the EV mode is on a side with a speed lower than motor traveling upper limit vehicle speed VMmax in the HV mode.

Figure 14:
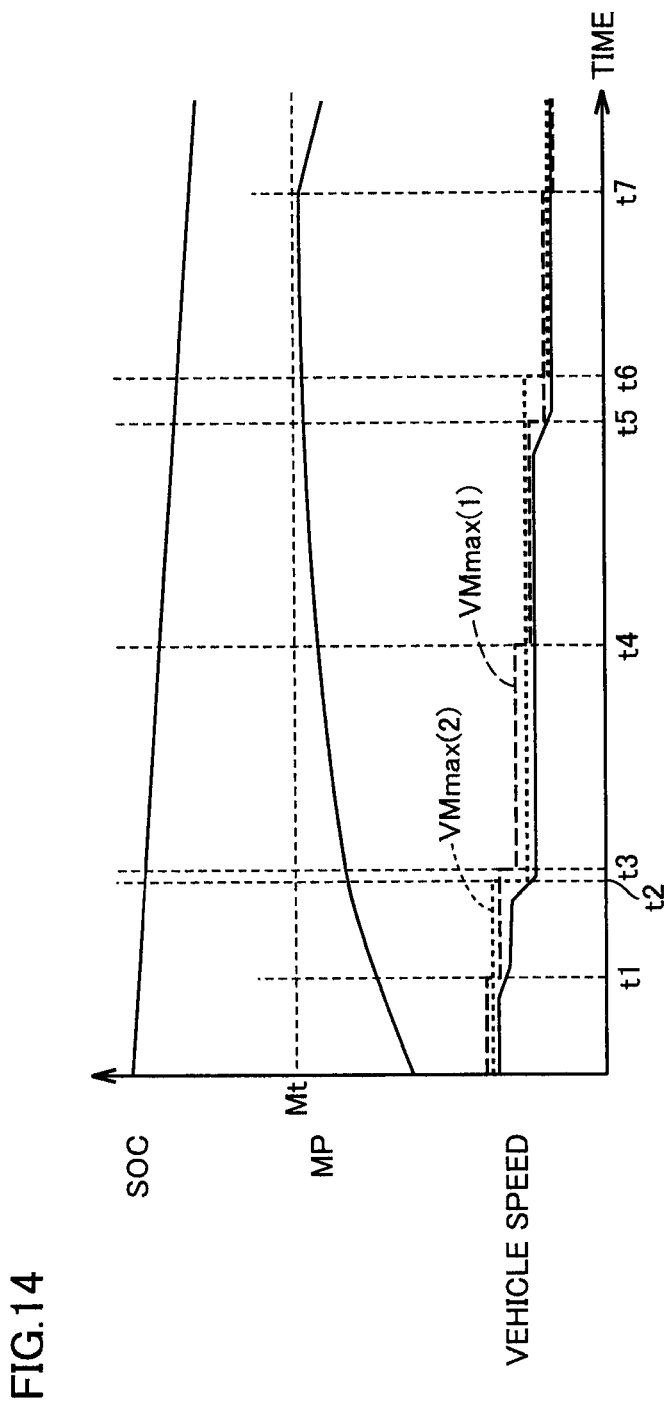
FIG. 14 is a conceptual diagram illustrating an example of vehicle speed limitation in motor traveling in the hybrid vehicle in accordance with Embodiment 2.

FIG. 14 shows one example of vehicle speed limitation for hybrid vehicle 5 in continuous motor traveling in the EV mode.

Referring to FIG. 14, due to continued motor traveling, the estimated SOC value (#SOC) is gradually reduced over time. Due to continuous discharging of power storage device 10 associated with motor traveling, current load parameter MP is also gradually increased in response to battery current Ib.

Motor traveling upper limit vehicle speed VMmax(1) in response to current load parameter MP is sequentially set in accordance with the map shown in FIG. 12. Similarly, motor traveling upper limit vehicle speed VMmax(2) in response to the estimated SOC value (#SOC) is sequentially set in accordance with the map shown in FIG. 13. At each control cycle, the minimum value of VMmax(1) and VMmax(2) is set as motor traveling upper limit vehicle speed VMmax.

In response to an increase in current load parameter MP, VMmax(1) is reduced at each of times t1, t3, t4, and t5. On the other hand, in response to a reduction in the estimated SOC value (#SOC), VMmax(2) is reduced at each of times t2 and t6. Since motor traveling upper limit vehicle speed VMmax is reduced by a reduction in VMmax(1) or VMmax(2), the vehicle speed of hybrid vehicle 5 is gradually limited and reduced.

When current load parameter MP reaches threshold value Mt at time t7, output power upper limit value Wout is lowered. As a result, engine 18 is started, and the traveling mode shifts from motor traveling to hybrid traveling. In hybrid traveling, the output by motor generator MG2 is reduced. Thus, the output power from power storage device 10 and battery current Ib are also reduced. Consequently, current load parameter MP starts decreasing.

It is to be noted that, to prevent engine 18 from being frequently started and stopped repeatedly, hysteresis is provided in the determination for shifting to motor traveling again. Thus, hybrid traveling is selected until current load parameter MP is sufficiently reduced and the limitation on output power upper limit value Wout is lifted, or the vehicle speed and/or driving torque of hybrid vehicle 5 are/is reduced.

In traveling control in which motor traveling upper limit vehicle speed VMmax is fixed, current load parameter MP is expected to reach threshold value Mt earlier when compared with the example shown in FIG. 14. Once output power upper limit value Wout is limited, there is a possibility that engine 18 is thereafter started more frequently. That is, it is understood that, in hybrid vehicle 5 in accordance with Embodiment 2, a period for which the output power from power storage device 10 can be ensured can be increased by changing (reducing) motor traveling upper limit vehicle speed VMmax in response to the state of power storage device 10.

As has been described above, in hybrid vehicle 5 in accordance with Embodiment 2, in the EV mode in which electric power of power storage device 10 is actively used, motor traveling upper limit vehicle speed VMmax can be variably set in response to the state of power storage device 10 (the SOC and current load parameter MP). Thereby, a period for which the vehicle can travel without limitation on output power upper limit value Wout by the SOC and/or current load parameter MP can be ensured sufficiently, when compared with Embodiment 1. As a result, since the frequency of operating engine 18 in the EV mode can be further reduced, deterioration in emission can be avoided and traveling with high energy efficiency can be performed.

It is to be noted that Embodiment 2 has described an example in which motor traveling upper limit vehicle speed VMmax is set using both of the SOC of power storage device 10 and current load parameter MP. From the viewpoint of protecting equipment, output power upper limit value Wout tends to be limited more strictly by current load parameter MP. Further, when output limitation by current load parameter MP is started, even if battery current Ib is reduced, a certain time lag occurs before the output limitation is lifted. Therefore, it is also possible to set motor traveling upper limit vehicle speed VMmax in response to only current load parameter MP. In this case, it is only required to omit the processing in step S155 in the flowchart of FIG. 11 and set as VMmax=VMmax(1) in step S156. Alternatively, motor traveling upper limit vehicle speed VMmax may be set as VMmax=VMmax(2) based on only the SOC.

However, if motor traveling upper limit vehicle speed VMmax is set considering both of the SOC and current load parameter MP, it is expected that cases where output power upper limit value Wout is limited will be reduced. That is, the effect exhibited by the present embodiment can be enjoyed more reliably.

It is noted for confirmation that, in Embodiments 1 and 2, the configuration of power control unit 20 is not limited to the one illustrated in FIG. 1, and any configuration is applicable as long as it is a configuration for driving motor generators MG1, MG2 using electric power of power storage device 10. It is also noted for confirmation that the configuration of the drive system for hybrid vehicle 5 is not limited to the one illustrated in FIG. 1. Similarly, it is also possible to apply a "power generation mechanism" different from motor generator MG1 in FIG. 1 as long as it is configured to generate charging power for the power storage device using the output of the engine.

Further, in Embodiment 2, it is also possible to apply any other parameter to which battery current Ib is reflected, instead of current load parameter MP. As long as it is a state quantity or parameter related to power storage device 10 which is reflected to limitation on output power upper limit value Wout, it can be used instead of current load parameter MP. This is because, by changing the upper limit vehicle speed in traveling of the vehicle using only the rotating electric machine (motor generator MG2) in response to such a parameter, a period for which output power upper limit value Wout is limited can be reduced, as in the traveling control for the hybrid vehicle as described above.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

INDUSTRIAL APPLICABILITY

The present invention is applicable to a hybrid vehicle capable of traveling using only an output of a rotating electric machine utilizing electric power of a vehicle-mounted power storage device.

REFERENCE SIGNS LIST

3: connector portion, 5: hybrid vehicle, 6: converter, 7: system main relay, 8: inverter, 10: power storage device, 11: monitoring unit, 12: temperature sensor, 13, 16: voltage sensor, 14: current sensor, 18: engine, 20: power control unit, 22: motive power split mechanism, 24F: driving wheel, 26: selection switch, 30: external charging unit, 30a: current control unit, 30b: voltage conversion unit, 35: connector receiving portion, 35a: coupling detection sensor, 95: reduction mechanism, 100: control device (ECU), 110: state estimation unit, 120: current load estimation unit, 150: charging/discharging control unit, 200: traveling control unit, 202: sun gear, 204: pinion gear, 205: traveling mode selection unit, 206: carrier, 208: ring gear, 210: motor traveling upper limit vehicle speed setting unit, 250: distribution unit, 260: inverter control unit, 270: converter control unit, 300: maximum output line (vehicle), 302, 304, 306: operating point, 340: maximum output line (motor traveling/HV mode), 350: maximum output line (motor traveling/EV mode), C: smoothing capacitor, CNL: negative charge line, CON: coupling signal, CPL: positive charge line, Ib: battery current, K: smoothing coefficient, MD: traveling mode signal, MG1: motor generator (power generation mechanism), MG2: motor generator (rotating electric machine), MP: current load parameter, Mt: threshold value, PWC, PWM1, PWM2: switching command, SE: relay control signal, SOCl to SOCu: SOC control range, SOCr: control central value, Smax: SOC upper limit value, Smin: SOC lower limit value, Sth: mode determination value, T: vehicle driving torque, TMmax: upper limit torque (motor traveling), Tb: battery temperature, V: vehicle speed, VMmax: motor traveling upper limit vehicle speed, Vb: battery voltage, Vh: system voltage, Vmax: upper limit vehicle speed (vehicle), Win: input power upper limit value, Wout: output power upper limit value.

The invention claimed is:
1. A hybrid vehicle, comprising:
a rotating electric machine for generating a vehicle driving force;
a power storage device mounted in the vehicle;
a power control unit for performing power conversion between said power storage device and said rotating electric machine;
an internal combustion engine for generating a vehicle driving force;

an external charging unit for charging said power storage device by a power source external to the vehicle; and
a control device for controlling traveling of the vehicle,
said control device including
    a traveling mode selection unit for selecting, in response to a state of charge of said power storage device, one of a first traveling mode in which said internal combustion engine and said rotating electric machine are used such that the vehicle travels mainly using an output of said rotating electric machine irrespective of a residual capacity of said power storage device, and a second traveling mode in which said internal combustion engine and said rotating electric machine are used such that the vehicle travels with the residual capacity of said power storage device being maintained within a predetermined control range,
    an upper limit vehicle speed setting unit for setting an upper limit vehicle speed for traveling of the vehicle using only the output of said rotating electric machine, in response to the traveling mode selected by said traveling mode selection unit, and
    a traveling control unit for controlling traveling of the vehicle to use both of outputs of said internal combustion engine and the rotating electric machine, if a vehicle speed exceeds said upper limit vehicle speed,
said upper limit vehicle speed setting unit setting said upper limit vehicle speed in said first traveling mode to be lower than said upper limit vehicle speed in said second traveling mode.

2. The hybrid vehicle according to claim 1, wherein
said traveling control unit controls said rotating electric machine and said internal combustion engine in said first traveling mode such that, if said hybrid vehicle has a torque and a vehicle speed inside a first region which is defined by a combination of said torque and said vehicle speed, the vehicle travels using only the output of said rotating electric machine, and if said hybrid vehicle has a torque and a vehicle speed outside said first region, the vehicle travels using both of the outputs of said rotating electric machine and said internal combustion engine, and controls said rotating electric machine and said internal combustion engine in said second traveling mode such that, if said hybrid vehicle has a torque and a vehicle speed inside a second region which is defined by a combination of said torque and said vehicle speed, the vehicle travels using only the output of said rotating electric machine, and if said hybrid vehicle has a torque and a vehicle speed outside said second region, the vehicle travels using both of the outputs of said rotating electric machine and said internal combustion engine, and
said first and second regions are set corresponding to a maximum output line in a traveling only by said rotating electric machine with said upper limit vehicle speed set by said upper limit vehicle speed setting unit reflected, in said first and second traveling mode, respectively.

3. The hybrid vehicle according to claim 1, wherein, in said first traveling mode, said upper limit vehicle speed setting unit variably sets said upper limit vehicle speed within a range lower than said upper limit vehicle speed in said second traveling mode, based on at least one of the state of charge and an input/output current of said power storage device.

4. The hybrid vehicle according to claim 3, wherein
said control device further includes a state-of-charge estimation unit for calculating an estimated residual capacity value of said power storage device based on an output of a sensor arranged in said power storage device,
    a current load estimation unit for calculating a current load parameter indicating a thermal load on equipment due to passage of said input/output current of said power storage device, based on said input/output current, and
    a charging/discharging control unit for variably setting an output power upper limit value of said power storage device based on the calculated estimated residual capacity value and current load parameter, and
in said first traveling mode, said upper limit vehicle speed setting unit variably sets said upper limit vehicle speed, at least based on said calculated current load parameter.

5. The hybrid vehicle according to claim 4, wherein said upper limit vehicle speed setting unit sets said upper limit vehicle speed in said first traveling mode, in accordance with a minimum value of a first upper limit speed variably set in response to said current load parameter and a second upper limit speed variably set in response to said estimated residual capacity value.

6. The hybrid vehicle according to claim 1, further comprising a display unit for causing a driver to visually recognize vehicle information,
wherein said display unit includes a display area for displaying a vehicle speed range in which traveling of the vehicle using only the output of said rotating electric machine is applicable, at least based on said upper limit vehicle speed set by said upper limit vehicle speed setting unit.

7. The hybrid vehicle according to claim 1, further comprising a power generation mechanism configured to generate charging power for said power storage device using the output of said internal combustion engine,
wherein, in said second traveling mode, if the residual capacity of said power storage device becomes lower than said control range, said traveling control unit controls said rotating electric machine and said internal combustion engine such that the charging power for said power storage device is generated by said power generation mechanism.

8. A control method for a hybrid vehicle including a rotating electric machine and an internal combustion engine each for generating a vehicle driving force, a power storage device mounted in the vehicle, a power control unit for performing power conversion between said power storage device and said rotating electric machine, and an external charging unit for charging said power storage device by an external power source,
said control method comprising the steps of:
    selecting, in response to a state of charge of said power storage device, one of a first traveling mode in which said internal combustion engine and said rotating electric machine are used such that the vehicle travels mainly using an output of said rotating electric machine irrespective of a residual capacity of said power storage device, and a second traveling mode in which said internal combustion engine and said rotating electric machine are used such that the vehicle travels with the residual capacity of said power storage device being maintained within a predetermined control range;
    setting an upper limit vehicle speed for traveling of the vehicle using only the output of said rotating electric machine, in response to the selected traveling mode; and controlling traveling of the vehicle to use both of outputs of said internal combustion engine and said rotating electric machine, if a vehicle speed exceeds said upper limit vehicle speed, in said step of setting, said upper limit vehicle speed in said first traveling mode is set to be lower than said upper limit vehicle speed in said second traveling mode.

9. The control method for the hybrid vehicle according to claim 8, wherein said step of selecting controls said rotating electric machine and said internal combustion engine in said first traveling mode such that, if said hybrid vehicle has a torque and a vehicle speed inside a first region which is defined by a combination of said torque and said vehicle speed, the vehicle travels using only the output of said rotating electric machine, and if said hybrid vehicle has a torque and a vehicle speed outside said first region, the vehicle travels using both of the outputs of said rotating electric machine and said internal combustion engine, and controls said rotating electric machine and said internal combustion engine in said second traveling mode such that, if said hybrid vehicle has a torque and a vehicle speed inside a second region which is defined by a combination of said torque and said vehicle speed, the vehicle travels using only the output of said rotating electric machine, and if said hybrid vehicle has a torque and a vehicle speed outside said second region, the vehicle travels using both of the outputs of said rotating electric machine and said internal combustion engine, and said first and second regions are set corresponding to a maximum output line in a traveling only by said rotating electric machine with said upper limit vehicle speed set by said step of setting reflected, in said first and second traveling mode, respectively.

10. The control method for the hybrid vehicle according to claim 8, wherein, in said first traveling mode, said step of setting variably sets said upper limit vehicle speed within a range lower than said upper limit vehicle speed in said second traveling mode, based on at least one of the state of charge and an input/output current of said power storage device.

11. The control method for the hybrid vehicle according to claim 10, further comprising the steps of:

calculating an estimated residual capacity value of said power storage device based on an output of a sensor arranged in said power storage device;

calculating a current load parameter indicating a thermal load on equipment due to passage of said input/output current of said power storage device, based on said input/output current; and variably setting an output power upper limit value of said power storage device based on the calculated estimated residual capacity value and current load parameter, and in said first traveling mode, said step of setting said upper limit vehicle speed variably sets said upper limit vehicle speed, at least based on said calculated current load parameter.

12. The control method for the hybrid vehicle according to claim 11, wherein said step of setting includes the steps of variably setting a first upper limit speed in response to said current load parameter, variably setting a second upper limit speed in response to said estimated residual capacity value, and setting said upper limit vehicle speed in said first traveling mode in accordance with a minimum value of said first upper limit speed and said second upper limit speed.

13. The control method for the hybrid vehicle according to claim 8, wherein said hybrid vehicle further includes a display unit for causing a driver to visually recognize vehicle information, and said control method further comprises the step of displaying a vehicle speed range in which traveling of the vehicle using only the output of said rotating electric machine is applicable on said display unit, at least based on said set upper limit vehicle speed.

14. The control method for the hybrid vehicle according to claim 8, wherein said hybrid vehicle further includes a power generation mechanism configured to generate charging power for said power storage device using the output of said internal combustion engine, and in said second traveling mode, if the residual capacity of said power storage device becomes lower than said control range, said step of controlling controls said rotating electric machine and said internal combustion engine such that the charging power for said power storage device is generated by said power generation mechanism.

* * * * *